United States Patent [19]

Simuttis et al.

[11] Patent Number: 5,503,376
[45] Date of Patent: Apr. 2, 1996

[54] HYDRAULICALLY DAMPING RUBBER SLEEVE SPRING

[75] Inventors: Arnold Simuttis, Bad Kreuznach; Werner Hettler, Mannheim; Axel Rudolph, Bensheim, all of Germany

[73] Assignee: Firma Carl Freudenberg, Germany

[21] Appl. No.: 201,593

[22] Filed: Feb. 25, 1994

[30] Foreign Application Priority Data

Feb. 25, 1993 [DE] Germany ............ 43 05 808.6

[51] Int. Cl.$^6$ ............................................ B60G 11/22
[52] U.S. Cl. ............. 267/293; 267/141.5; 267/141.7
[58] Field of Search ............ 267/140.12, 140.4, 267/140.5, 141.1–141.5, 270, 280–282, 293, 294; 280/672, 673, 693, 695, 698, 700, 702; 384/220

[56] References Cited

U.S. PATENT DOCUMENTS

| | | | |
|---|---|---|---|
| 4,002,327 | 1/1977 | Damon | 267/141.4 |
| 4,767,108 | 8/1988 | Tanaka et al. | 267/140.12 |
| 4,809,960 | 3/1989 | Kakimoto et al. | 267/293 |
| 4,982,938 | 1/1991 | Brenner | 267/140.12 |
| 5,048,803 | 9/1991 | Brenner | 267/140.12 |
| 5,062,654 | 11/1991 | Kakimoto et al. | 267/293 |
| 5,100,114 | 3/1992 | Reuter et al. | 267/293 |
| 5,165,669 | 11/1992 | Mayerbock et al. | 267/140.12 |

FOREIGN PATENT DOCUMENTS

| | | | |
|---|---|---|---|
| 3810310 | 10/1989 | Germany. | |
| 0118135 | 5/1987 | Japan | 267/293 |
| 0124333 | 6/1987 | Japan | 267/293 |
| 01753090 | 8/1992 | U.S.S.R. | 267/293 |
| 1206895 | 9/1970 | United Kingdom | 267/293 |

*Primary Examiner*—Robert J. Oberleitner
*Assistant Examiner*—Chris Schwartz
*Attorney, Agent, or Firm*—Kenyon & Kenyon

[57] ABSTRACT

A hydraulically damping rubber sleeve spring containing two annular parts is disclosed. The parts are assembled axially, and each annular part has an inner support sleeve and an outer support sleeve surrounding the inner one with radial spacing, as well as a spring element made of an elastomeric material which connects the support sleeves. The annular parts are provided with at least two recesses, and are configured and assembled such that the recesses complement one another to form first and second fluid-filled working chambers. The chambers are sealed with respect to the environment and joined to one another, in a manner allowing fluid to pass, by at least one damping passage. The two spring elements of the annular parts are braceable against one another in such a way that the axial and radial spring stiffness can be adjusted separately from one another.

14 Claims, 10 Drawing Sheets

HYDRAULICALLY DAMPING RUBBER SLEEVE SPRING

BACKGROUND OF THE INVENTION

1. Field of the Invention

The present invention concerns a hydraulically damping rubber sleeve spring comprising two separately constructed annular parts that are assembled axially. Each annular part has an inner-support sleeve and an outer support sleeve surrounding the inner support sleeve with radial spacing, as well as a spring element made of an elastomeric material which connects the support sleeve and which is provided with at least two recesses. The annular parts are configured and assembled such that the recesses complement one another to form first and second fluid-filled working chambers, which are sealed with respect to the outside environment and are connected, in a manner to allow fluid to pass therebetween, by at least one damping device.

2. Description of Related Art

A rubber sleeve spring is shown in German Patent 38 10 310. The rubber mount shown therein is designed so that the rubber spring can be shear-loaded, and so that high-frequency vibrations with low amplitudes are not damped, but low-frequency vibrations with large amplitudes are strongly damped. Damping of vibrations depending upon conditions is possible only in the radial direction; spring stiffnesses in the axial and radial directions are insufficiently adjustable to the particular application, since cylindrical hollow springs are axially stiff and can only be designed to be radially soft with large radial loads.

Because of physical principles, other common rubber sleeve spring embodiments with springs arranged only radially and with comparatively thin chambers walls on the ends yield relatively high radial spring rates and very low axial spring rates.

SUMMARY OF THE INVENTION

The underlying object of the present invention is to develop a hydraulically damping rubber sleeve spring in such a way that the axial and radial spring stiffnesses can be adjusted as desired for the particular application.

In the present invention, provision is made for the two spring elements of the annular parts to be braceable against one another in such a way that the axial and radial spring stiffnesses can be adjusted separately from one another. Because of this separate adjustability, the characteristics of the rubber sleeve spring can be adapted to the particular application. A rubber sleeve spring of this kind can support large static loads, for example more than 1 kN, radially, and at the same time handle high dynamic loads axially. The ability to support dynamic loads axially is required, for example, if the rubber sleeve spring is utilized in commercial vehicles to support the cab on the chassis. The damping device provides high damping radially at low frequencies, preferably between 5 and 15 Hz. The two annular parts, constructed separately, result in easy installation of the rubber sleeve spring, which is of significantly economical and easy to produce engineering.

The spring elements of the present invention can delimit at least one of the working chambers—on the side facing away from the inner support sleeve—with a roof-shaped profile. To set a radial preload, the spring elements are manufactured with a greater axial extension than in the preloaded assembled state, and to set the axial preload the axially adjacent inner and outer support sleeves at least partly surround one another when assembled. It is advantageous for the rubber sleeve spring to be manufactured only from two rubber and metal parts that are braced against one another in the axial direction. The static and dynamic loads in the axial direction are principally transferred, via support components similar to sleeve springs, from the inner sleeves (which extend locally radially) to the outer sleeves (which also have a locally radial extension). Very high damping in the radial direction is achieved when low-frequency vibrations with large amplitudes are introduced by the fact that the spring elements delimit the working chambers in a roof-shaped manner, and thus extend into the region of the radially outwardly projecting inner support sleeves. Each of the two working chambers thus has a large hydraulically effective piston surface. For damping, fluid components can be pumped out of the working chamber at comparatively higher pressure, through the damping device, which for example can consist of a throttling passage or a canceling passage, into the working chamber at relatively lower pressure. This configuration eliminates cavitation phenomena at high force or travel amplitudes.

According to an advantageous embodiment of the present invention, the inner and outer support sleeves can be made of a metallic material, with at least one of the inner and at least one of the outer support sleeves positively surrounding one end of the axially adjacent support sleeves. In conjunction with spring elements with relatively hard expanding characteristics forming the chamber walls of the rubber sleeve spring, this configuration ensures good dimensional stability for the rubber sleeve spring, and good support of axial loads. Fastening of the support sleeves that are mutually adjacent in the axial direction can preferably occur by simply flanging the support sleeves.

To handle higher loads radially and axially, the spring elements can be manufactured so as to delimit a substantially O-shaped gap on the sides of the elements facing one another. When the two axially adjacent annular elements are assembled to one another under axial preload, the configuration of the mutually adjacent end surfaces of the spring elements produces elastic deformation and bulging in this region, which leads to an increase in the spring rate in both the axial and radial directions.

The expansions of the spring elements can form at least one throttling passage on the sides of the spring elements facing one another. With this configuration, there is no need for separately formed damping openings. The elastomeric material of the spring elements acts as a seal in the region of the separation gap between the two axially adjacent spring elements.

The throttling passage can be arranged in the region of the inner periphery of the outer support sleeves. Because the spring elements are designed to have relatively hard expansion characteristics, a very long throttling passage is needed to damp low-frequency vibrations, so as to achieve the desired damping effect with the resonant vibration of the fluid components inside the throttling passage. In addition to the arrangement of the throttling passage in the region of the outer periphery of the mount, it can also be serpentine in shape. Preferably the folding extends over twice the circumference of the rubber sleeve spring. If the pressure in the two working chambers needs to be limited, valve functions can be achieved by making the rubber suitably thin in the region of mutually adjacent passage segments. In extreme cases, a hydraulic short circuit can even be achieved at a pressure of a certain definable magnitude by appropriately locating the openings of the passage into the two chambers. A configuration deviating from this, for example providing the fluid-carrying connection between the working chambers by means of a throttle bore, is also possible.

The inner sleeves can be supported, on the inside and in the region of their ends, by at least one slide bushing made of a polymeric material, the slide bushing being guided axially and radially in a bearing bracket. A configuration of this kind is especially suitable when the rubber spring sleeve according to the invention is utilized to mount the cab of a commercial vehicle. It is advantageous for the cab to pivot about the bushing axis without exerting torsion on the spring elements inside the rubber sleeve spring. Low-friction materials, preferably polyamide or PTFE plastics, are preferably utilized.

When assembled, the inner support sleeves can have a substantially trough-shaped profile, and can be at least partly surrounded at an end by a first rubber spillover formed as a single unit with the adjoining spring element. The outer support sleeve of one of the two annular parts at least partly axially overlaps the axially adjacent annular part, such that the outer support sleeve is at least partially provided on the outer periphery with a second rubber spillover. In addition to simple installation in the vehicle because of the limited number of components, which can be preassembled in a bearing bracket, the rubber spillovers compensate for radial and axial tolerances of the rubber sleeve spring. The rubber spillover can be provided with local elevations so that the rubber spring sleeve can be fastened in the receptacle in the machine part with zero clearance and with a preload of definable magnitude, without being damaged when it is pressed in.

The rubber spillovers can each be provided with a contour designed to compensate for lengthwise and diametrical tolerances. The contour in the region of the second rubber spillover can extend circumferentially in an undulating fashion, while the contour on the first rubber spillover at the end preferably has knobs on it.

A modification of utilization characteristics can be achieved, for example, by arranging axially between the annular parts a valve made of an elastomeric material, which is provided with a closure member projecting toward the inner support sleeves, such that the closure member divides each working chamber into two axially adjacent subchambers, and can be actuated by differential pressure inside the subchambers. The arrangement of the valve provides not only radial damping of the rubber sleeve spring, but also axial damping. In the interest of ease of manufacture and installation, the valve can be arranged in the separation plane between the axially adjacent annular parts. The closure member is radially separated from the inner support sleeves only by a narrow gap, and thus forms a throttling point to generate axial damping.

The rubber sleeve spring according to the invention has good characteristics in terms of supporting radial and axial loads, combined with radial and axial damping, as well as a simple construction with few parts.

Several exemplary embodiments of the rubber sleeve spring according to the invention are depicted in FIGS. 1 to 10, and are described in greater detail below.

DETAILED DESCRIPTION OF THE DRAWINGS

Shown in the exemplary embodiments according to FIGS. 1 to 11 are hydraulically damping rubber sleeve springs 1 that consist substantially of two annular parts 2, 3 constructed separately from one another. To allow the axial and radial spring stiffness of rubber sleeve spring 1 to be adjusted separately, the two spring elements 6 of annular parts 2, 3 are braced against one another by inner and outer support sleeves 4, 5 in such a way that rubber sleeve spring 1 can support loads radially and axially. Inner 4 and outer 5 support sleeves are each made in two parts 4.1, 4.2; 5.1, 5.2, such that in each case one of support sleeves 4.1, 5.1 surrounds, in the region of its axial end, support sleeve 4.2, 5.2 that is adjacent in the axial direction, and is flanged over in this region. Spring elements 6 of the two annular elements 2, 3 have recesses 7, 8 that delimit working chambers 9, 10 which face one another in the direction of introduced radial vibrations. First and second working chambers 9, 10 are joined to one another by a damping device 11, which is configured as a throttling passage 14, in a manner allowing fluid to pass. Like the two recesses 7, 8, throttling passage 14 is also arranged in the region of the end delimitation of at least one of the two spring elements 6, and is sealed by the fact that the mutually adjacent spring elements 6 press against one another axially. To provide the greatest possible delivery surface, the two working chambers 9, 10 are delimited by a roof-shaped profile 12 of spring elements 6. Low-frequency vibrations are damped by displacement of fluid inside throttling passage 14; the large piston surface resulting from roof-shaped profile 12 promotes damping. To support large radial and axial loads, the chamber walls of first and second working chamber 9, 10 are preferable designed to have comparatively stiff expansion characteristics, so that it has proven advantageous to provide a serpentine damping passage 14 that extends in the region of the outer periphery of elastomeric sleeve spring 1.

Figure 1:
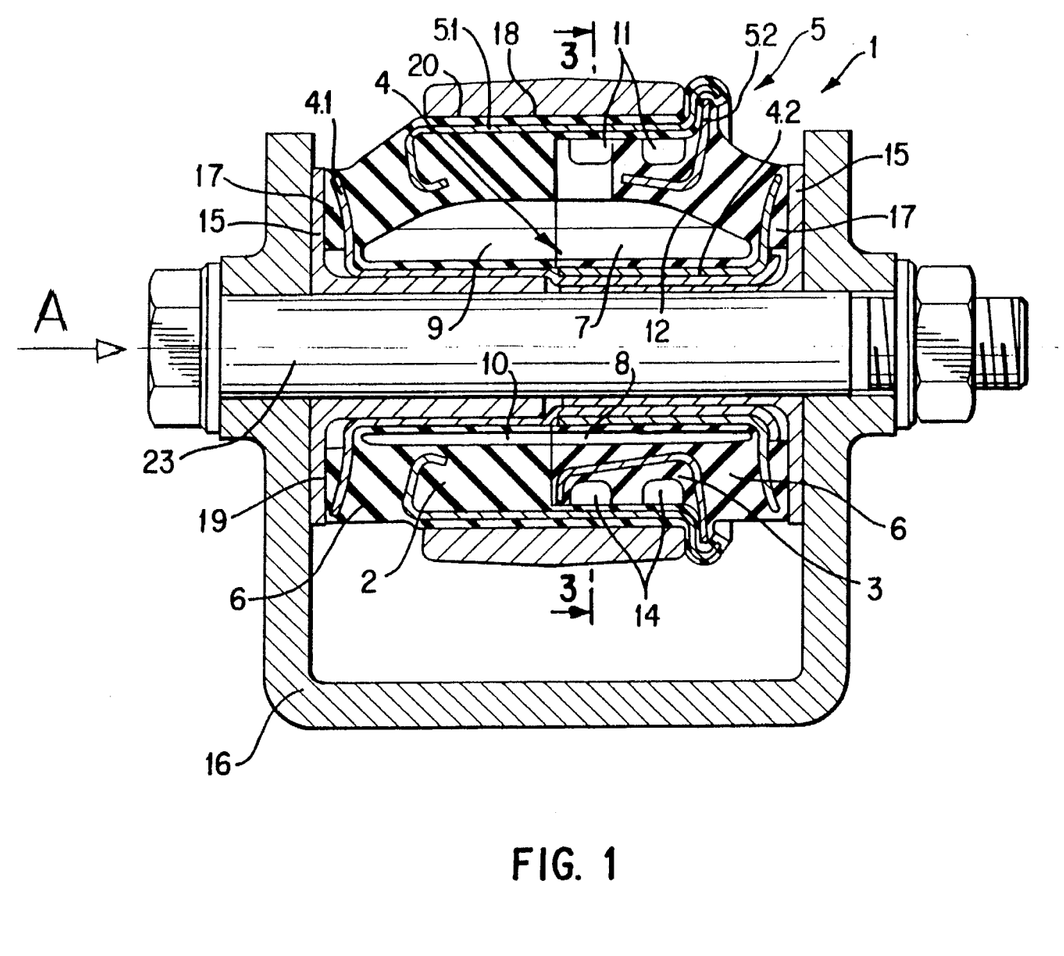
FIG. 1 shows a first exemplary embodiment of a rubber sleeve spring that is arranged on a slide bushing in a bearing bracket.

In FIG. 1, inner and outer support sleeves 4, 5 are provided with ends projecting radially, in order to be able to handle radial and axial loads. Bearing bracket 16, which can constitute a component of a chassis of a commercial vehicle, consists of a U-shaped shackle through which passes a shaft 23 which receives rubber sleeve spring 1. Rubber sleeve spring 1 is preassembled, and is provided in the region of both first and second rubber spillovers 17, 18 with a contour 19 so it can be arranged with zero clearance inside bearing bracket 16. Rubber sleeve spring 1 is supported in the direction of shaft 23 against a slide bushing 15 configured in two parts, which in the region of the ends of rubber sleeve spring 1 extends radially in order to allow pivoting of the cab without exerting torsion on spring elements 6. In the exemplary embodiments depicted here, slide bushing 15 is made of PTFE. In this exemplary embodiment throttling passage 14 is serpentine, and extends twice along the inner circumference of outer support sleeve 5.1.

Figure 2:
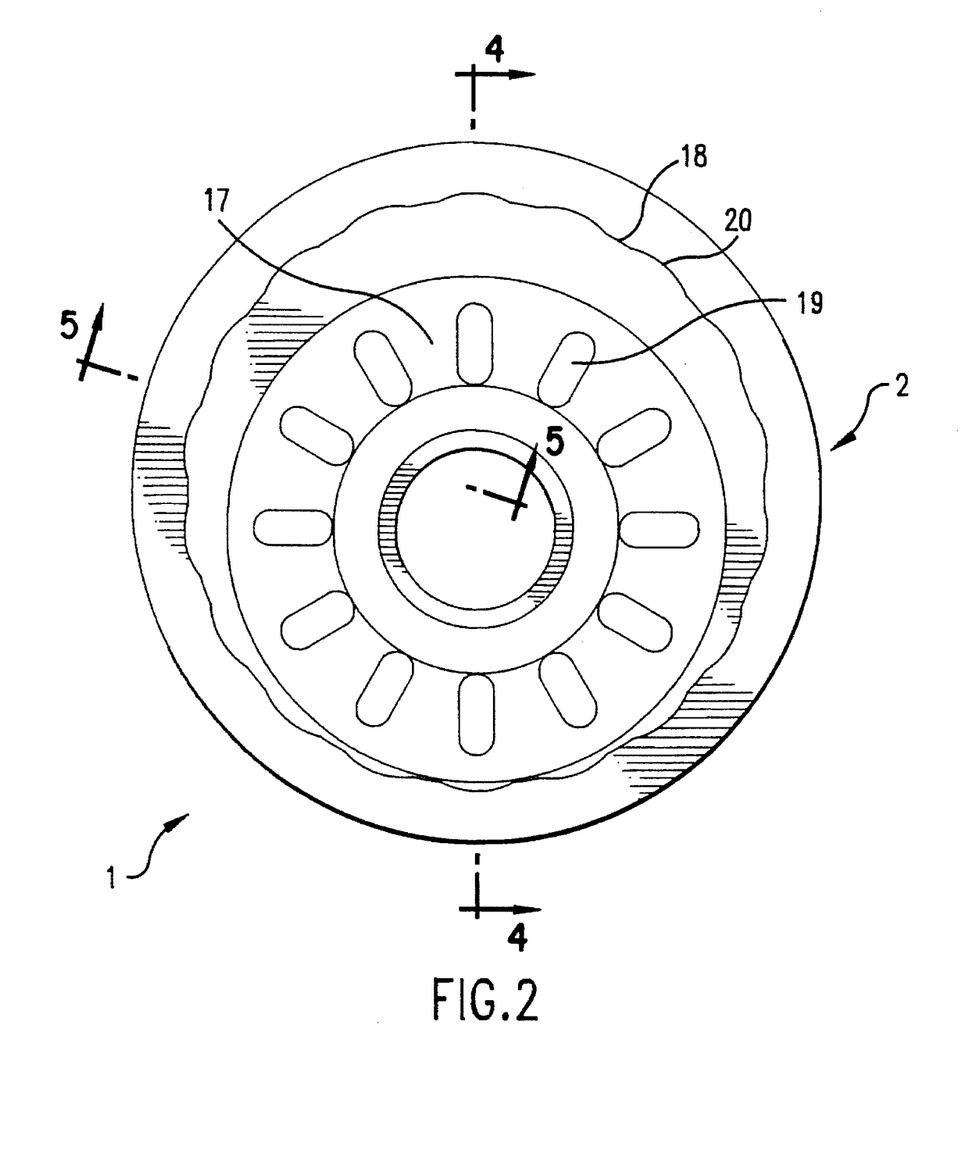
FIG. 2 shows an end view of the rubber sleeve spring of FIG. 1 from the left, along arrow a for clarity, the bearing bracket and slide bushing are not depicted.

FIG. 2 depicts the mount from FIG. 1, seen from the left along arrow a. To illustrate the actual rubber sleeve spring 1, slide bushing 15 and bearing bracket 16 from FIG. 1 are not shown. First and second rubber spillovers 17, 18 with their contours 19, 20 are readily visible in this drawing. In the region of the end of annular part 2, first rubber spillover 17 possesses a contour in the form of oval knobs. Manufacturing-related axial tolerances of rubber sleeve spring 1 and/or of bearing bracket 16 from FIG. 1 can easily be compensated for by contour 19 of first rubber spillover 17. Second rubber spillover 18 extends around the outer circumference of outer support sleeve 5.1 of annular part 2, and has an undulation running around the periphery as its contour 20. Diametrical tolerances of the component surrounding rubber sleeve spring 1 and/or of rubber sleeve spring 1 are compensated for by the elastic resilience of contour 20.

Figure 3:
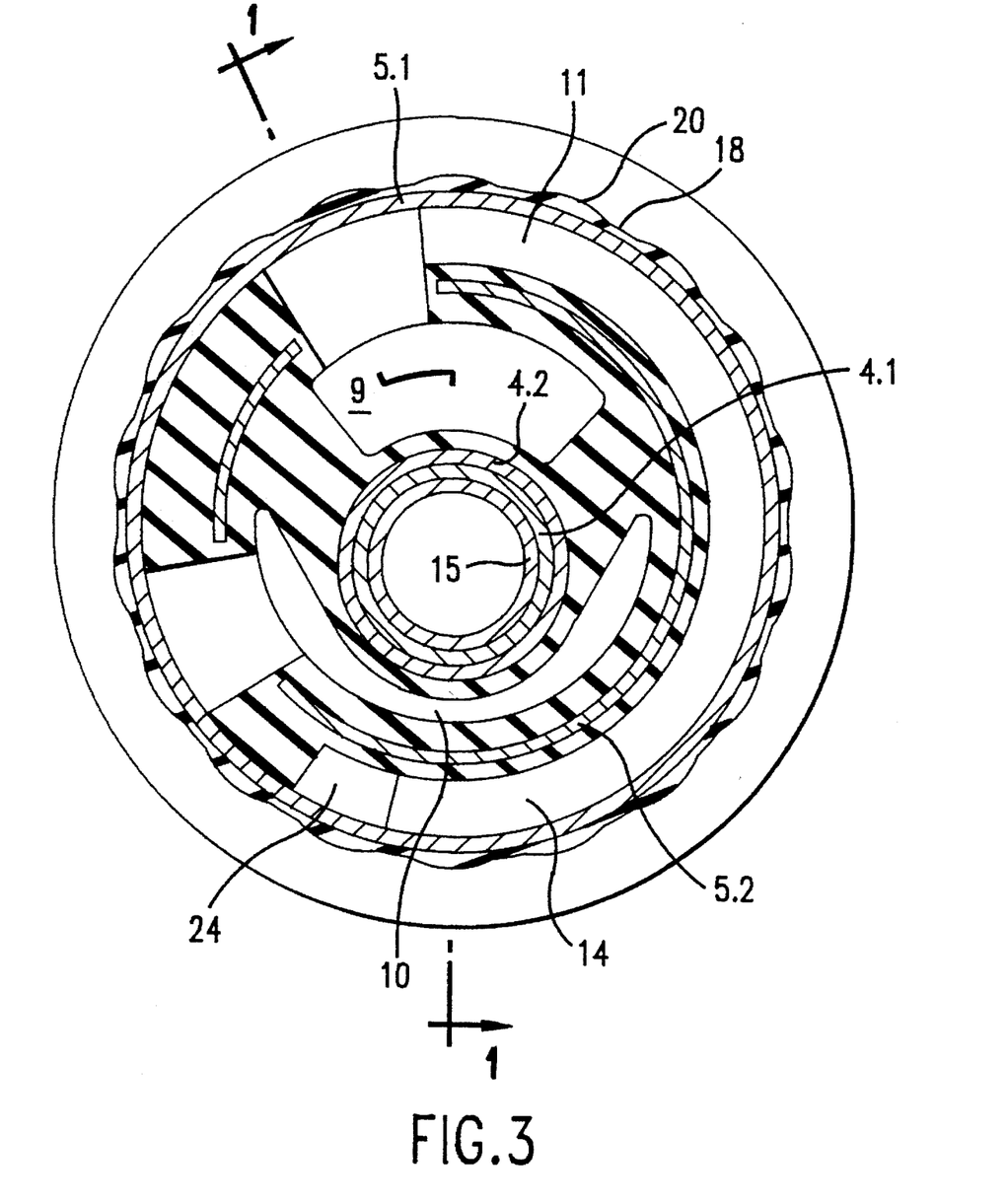
FIG. 3 shows the rubber sleeve spring of FIG. 1 sectioned along line 3—3.

FIG. 3 depicts rubber sleeve spring 1 from FIG. 1 along section 3—3. The serpentine damping device 11 in the form of a throttling passage 14 is evident in this Figure. The axially adjacent passage is reached through connecting opening 24, into which damping fluid is diverted. The serpentine configuration of throttling passage 14, and its consequent great length, result in outstanding damping of low-frequency vibrations in the range of 5 to 15 Hz. Contour 20 of second rubber spillover 18 extends along the outer peripheral surface of outer support sleeve 5.1.

Figure 4:
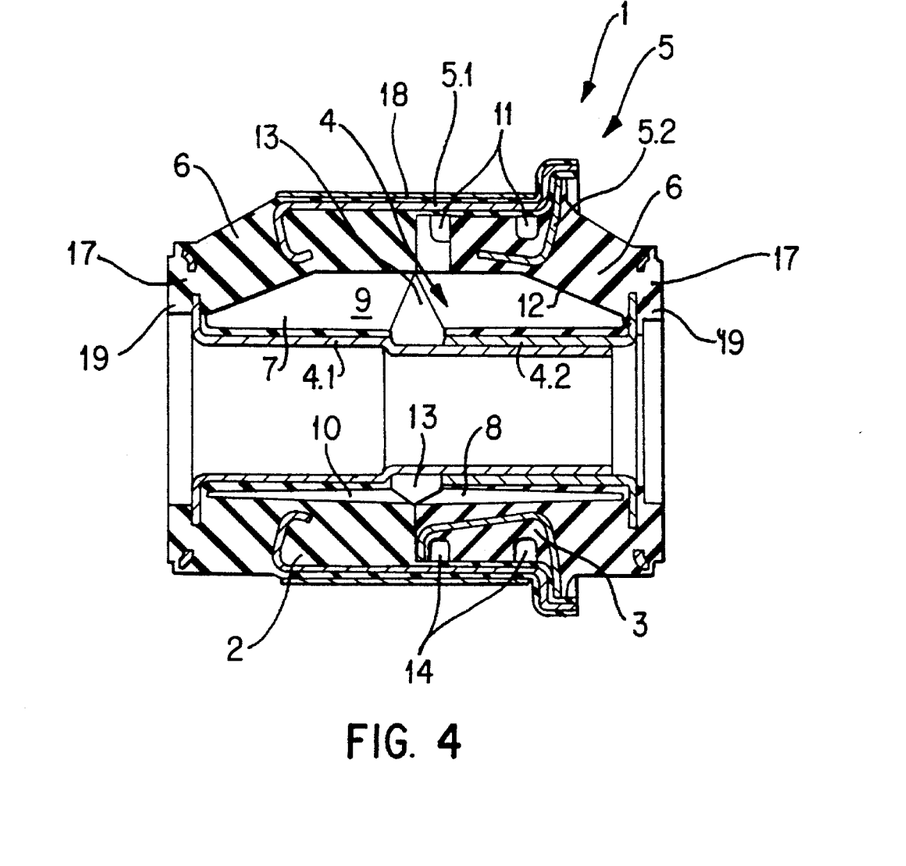
FIG. 4 shows the two annular parts without preload, sectioned along line 4—4 of FIG. 2.

FIG. 4 depicts rubber sleeve spring 1 from FIG. 2, sectioned along line 4—4. The two annular parts 2, 3 are shown unbraced, as manufactured. Spring elements 6 of the two annular parts 2, 3 have an axially recessed profile on their ends facing one another, so that the ends delimit a O-shaped gap 13.

Figure 5:
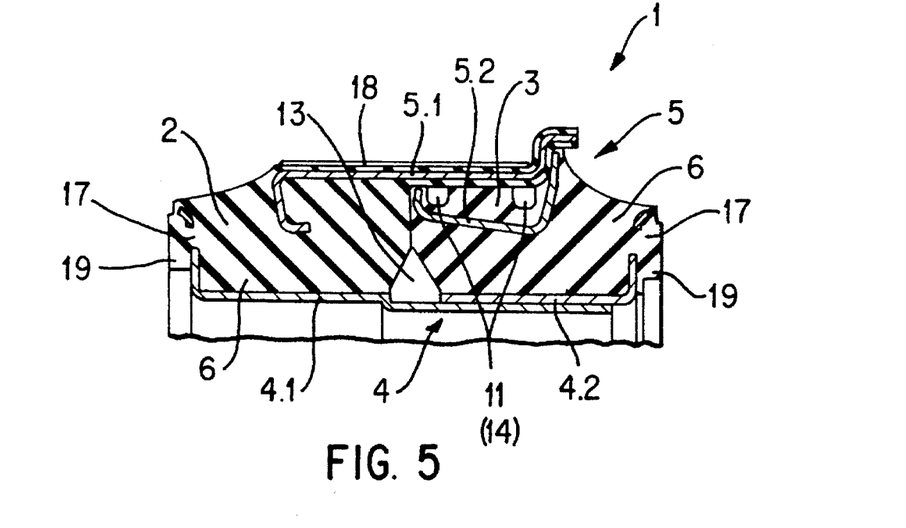
FIG. 5 shows a section along line 5—5 of FIG. 2.

FIG. 5 shows section 5—5 from FIG. 2 in a semi-sectioned depiction; it is evident that when the two annular parts 2, 3 are braced together axially, bulging of the two spring elements 6 occurs. The spring stiffness is adjusted by means of the configuration of spring elements 6 and the geometry of inner support sleeves 4.1, 4.2, which for assembly are brought into positive engagement with one another. In the exemplary embodiment shown here, inner support sleeve 4.1 is flanged radially outward after the two annular parts 2, 3 are slid together axially.

Figure 6:
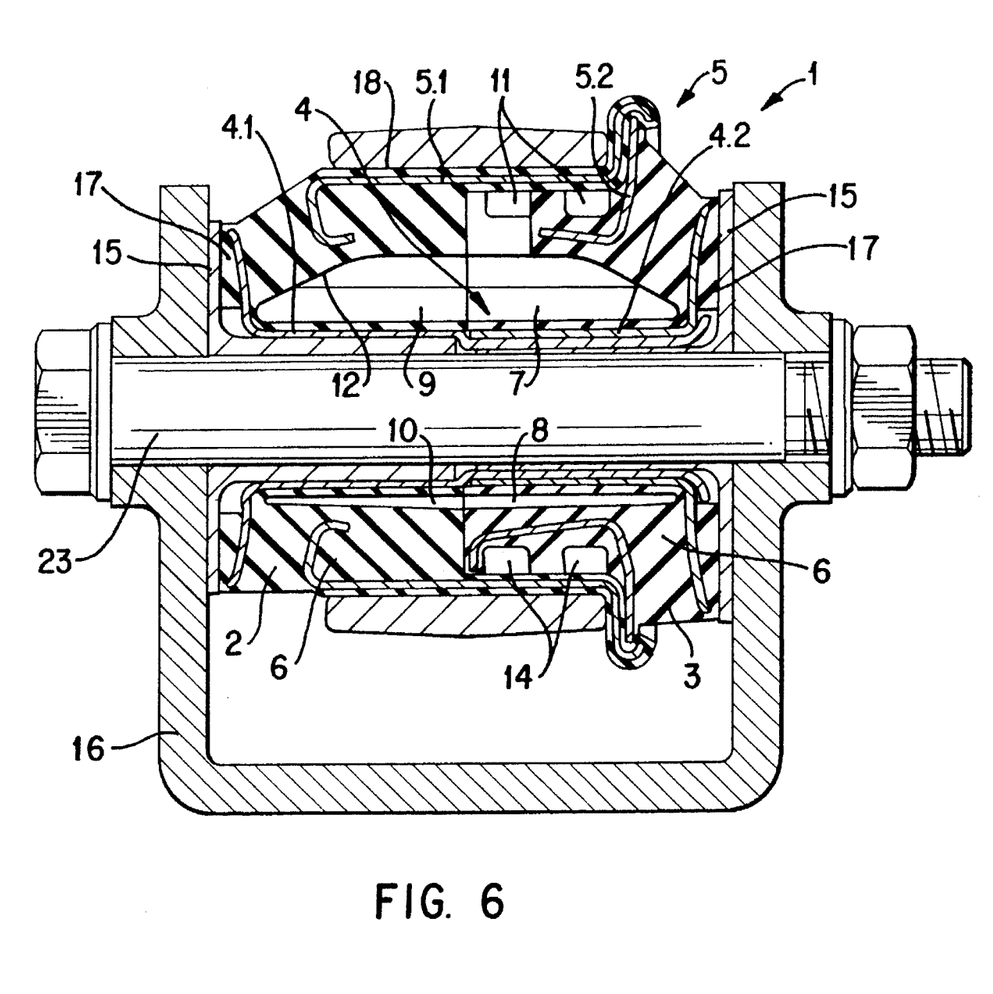
FIG. 6 shows a second exemplary embodiment of a rubber sleeve spring, similar to the exemplary embodiment of FIG. 1, wherein a spring element of an annular part is configured as an axial spring reinforced on one side.

FIG. 6 shows a second exemplary embodiment of rubber sleeve spring 1 according to the invention, wherein spring element 6 of annular part 3 is reinforced compared with spring element 6 from annular part 2. Forces that preferably act only from an axial direction can be better supported because of the asymmetrical configuration of the two rubber sleeve springs. For this purpose, the side that primarily bears compressive forces is enlarged in diameter, and its wall thickness is increased.

Figure 7:
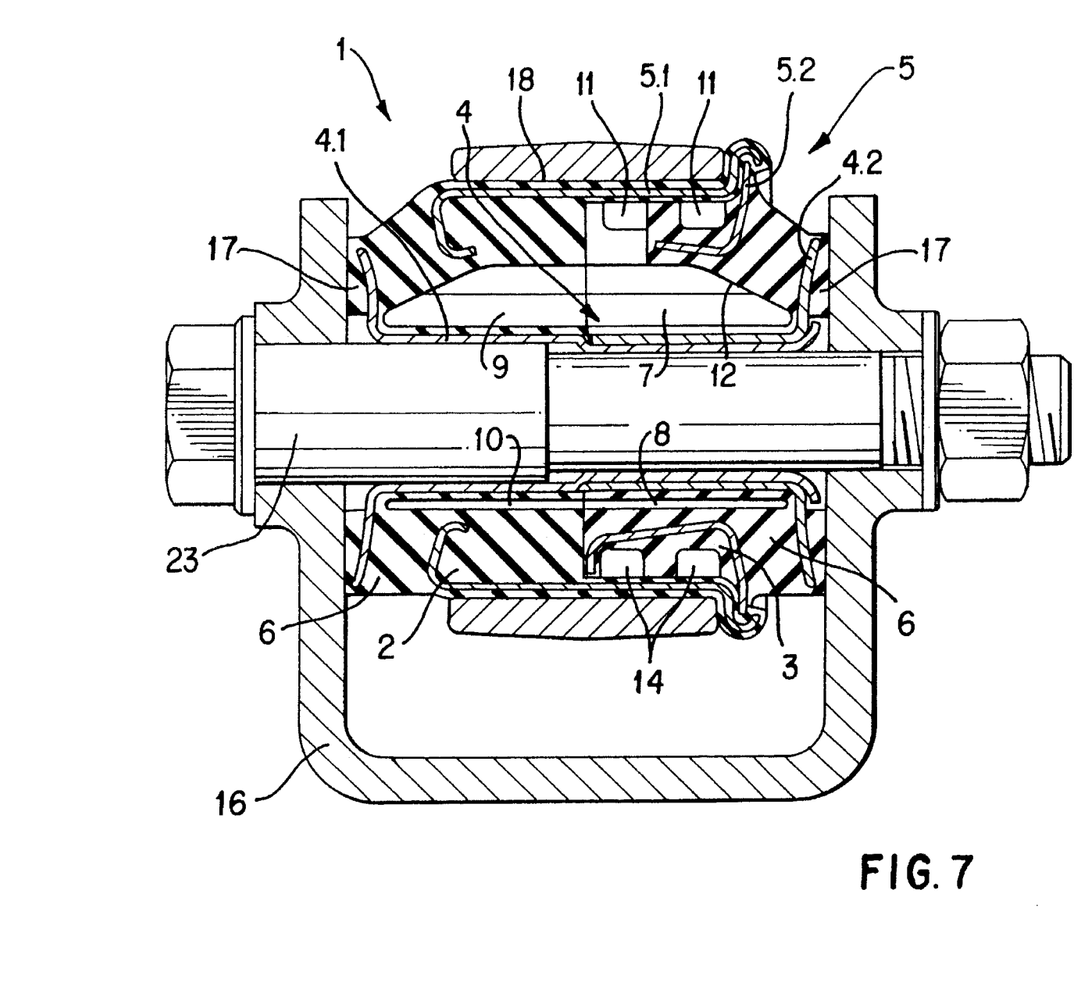
FIG. 7 shows a third exemplary embodiment that substantially corresponds to the exemplary embodiment from FIG. 1, but wherein for the purpose of another application no slide bushings are provided.

FIG. 7 shows a third exemplary embodiment that substantially corresponds to the first exemplary embodiment from FIG. 1. However, rubber sleeve spring 1 shown here is utilized not as the mount for the cab of a commercial vehicle, but to support two machine parts against one another. Because the two machine parts are not designed to pivot with respect to each other, slide bushing 15 is not needed.

Figure 8:
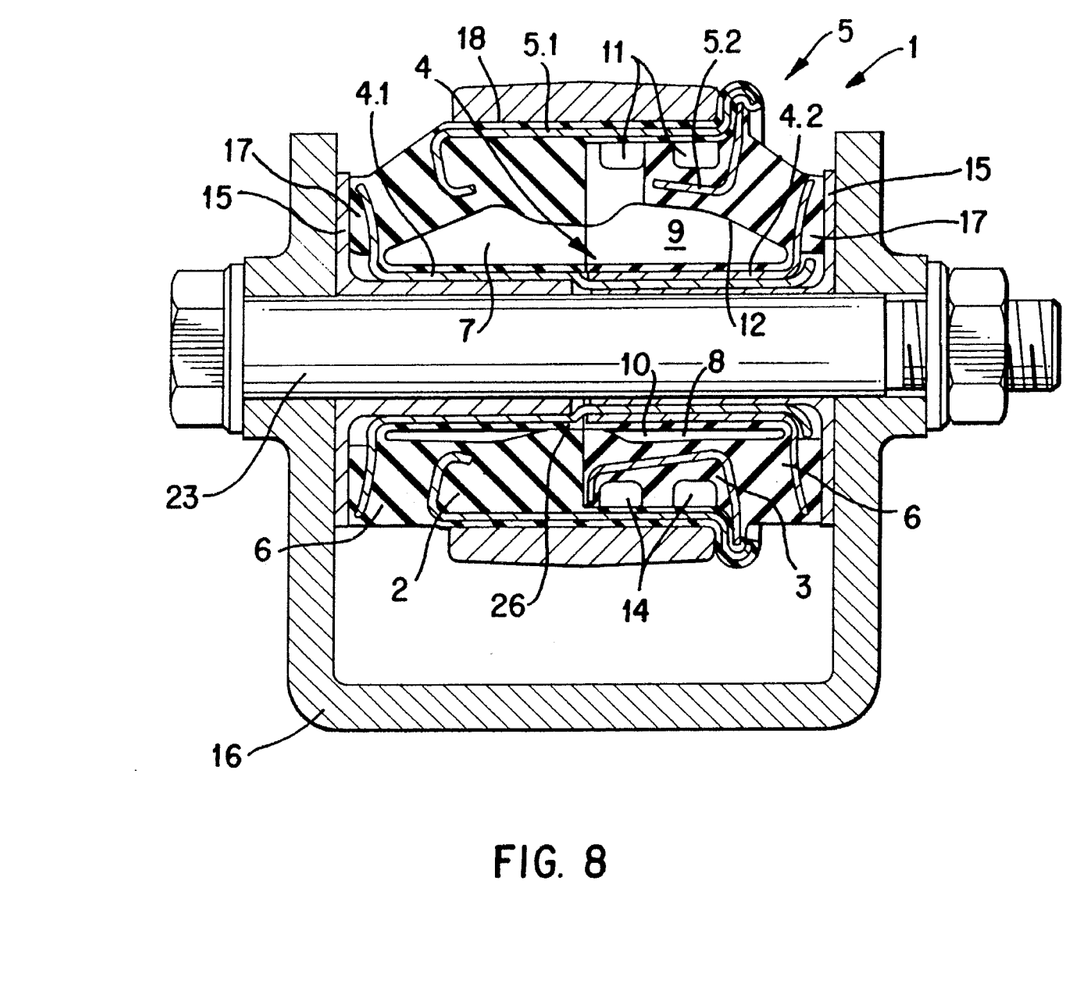
FIG. 8 shows a fourth exemplary embodiment in which projecting soft stops are formed radially by the axial bulging of the spring elements.

FIG. 8 differs from the configurations described above in that the two spring elements 6 of annular parts 2, 3 are preloaded axially in such a way that assembly results in a stop buffer 26. Bulging of the elastomeric material arranged between the radial projections of inner support sleeves 4.1, 4.2 in the separation plane between the two annular parts 2, 3 causes the rubber portion, which is axially displaced, to expand radially. Assembly then results in a local thickening that can be used as a stop buffer 26 to limit extreme deflections.

Figure 9:
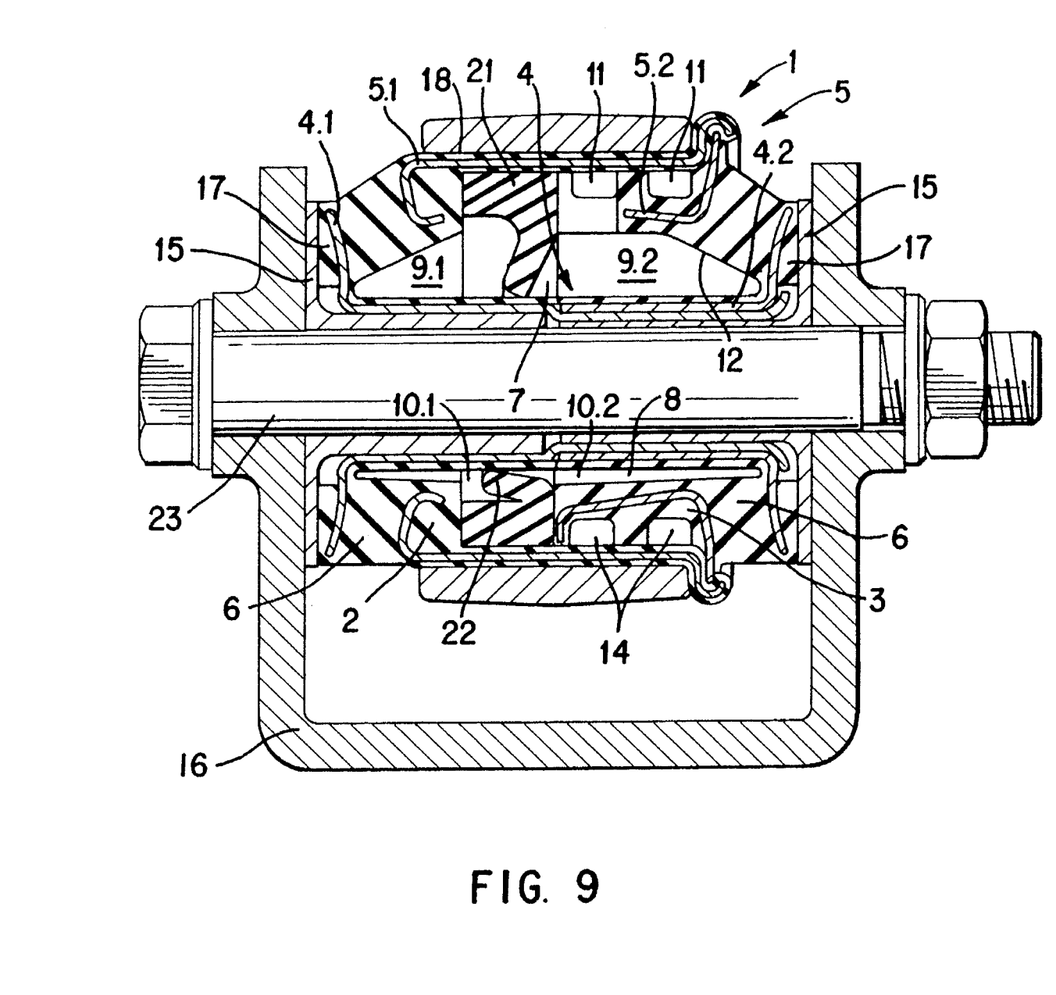
FIG. 9 shows a fifth exemplary embodiment of a rubber sleeve spring that has damping in the axial direction in addition to radial damping.

In many cases it has proven advantageous if, in addition to damping in the radial direction, deflections in the axial direction can also be damped. A rubber sleeve spring 1 that meets such requirements is shown in FIG. 9. Inserted between the two annular parts 2, 3, inside the separation plane, is a valve 21 made of an elastomeric material, which is held in position by the axial bracing of the two annular parts 2, 3. Closure member 22 of valve 21 delimits, together with inner support sleeve 4.1, a gap that is configured as a throttling point.

Figure 10:
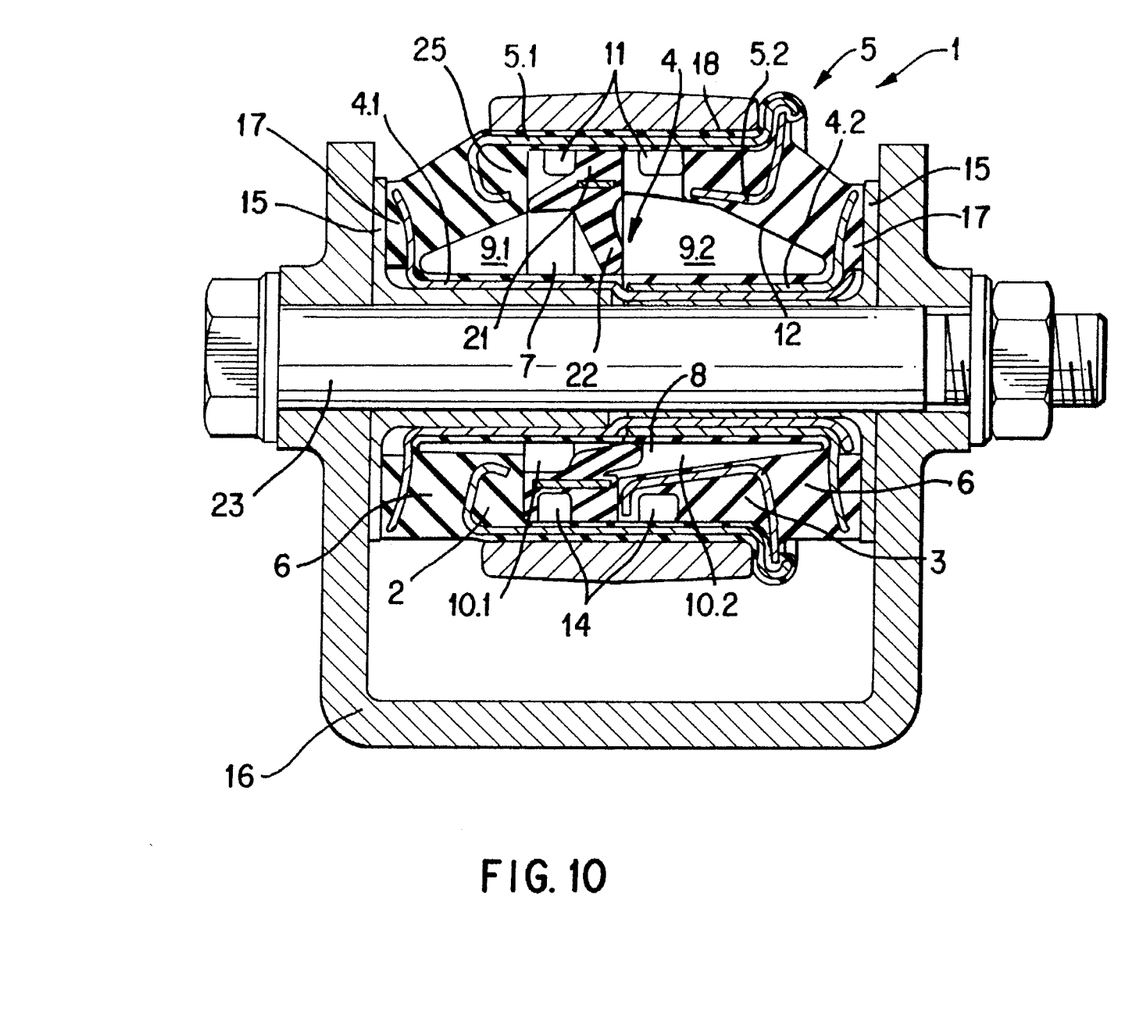
FIG. 10 shows a sixth exemplary embodiment, similar to the exemplary embodiment from FIG. 9, wherein in addition to radial and axial damping, a valve is provided to reduce pressure peaks.

FIG. 10 shows a rubber sleeve spring I that substantially corresponds to rubber sleeve spring 1 from FIG. 9. In this exemplary embodiment valve 21 has a second closure member 25 that is arranged in the separation gap between axially adjacent annular elements 2, 3. Second closure member 25 is arranged at the outlet of the double-circumference throttling passage 14 for shock decoupling, i.e. to reduce pressure peaks. If pressure exceeds an allowable maximum, the second closure member opens toward the first working chamber, thus reliably preventing damage to rubber sleeve spring 1. In this exemplary embodiment, valve 21 is designed as a rubber and metal part to provide enhanced dimensional stability.

Figure 11:
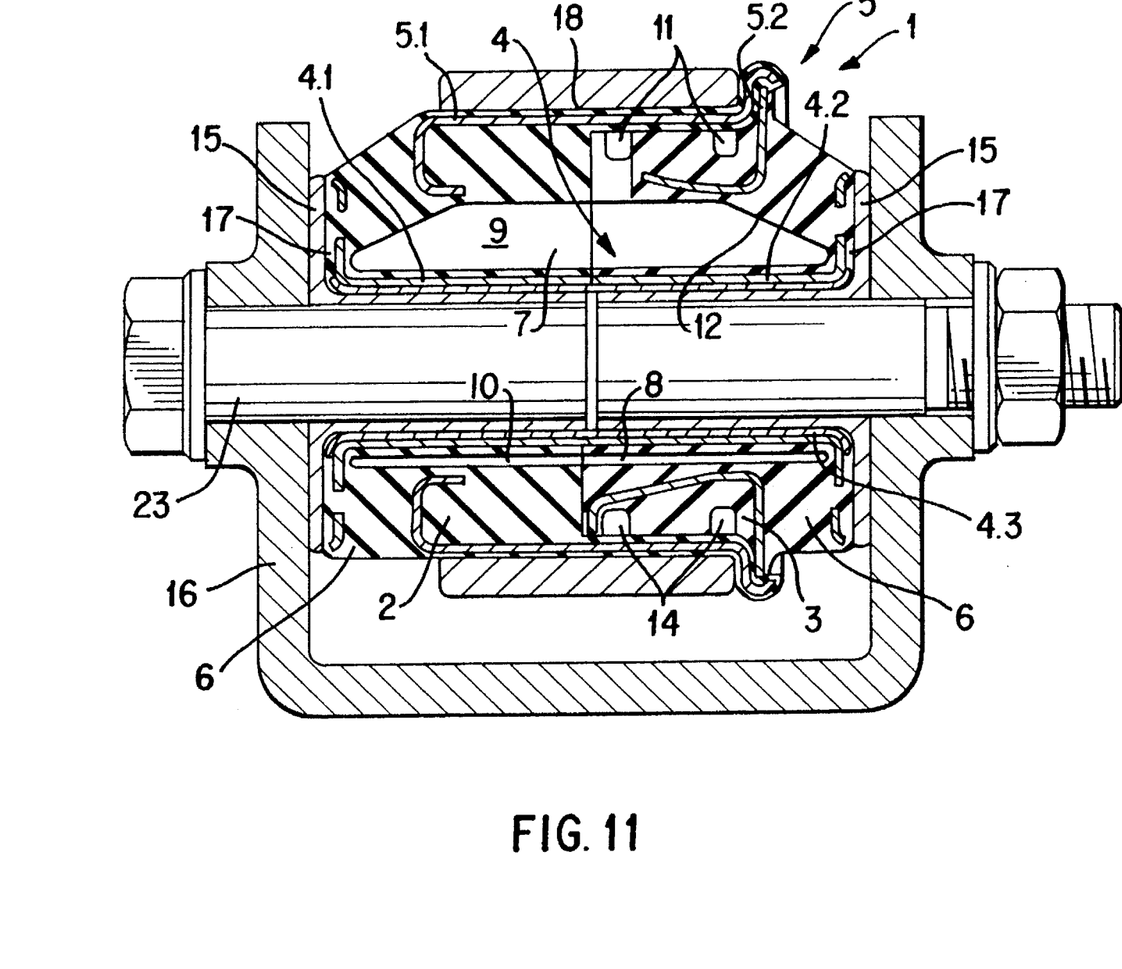
FIG. 11 shows a seventh exemplary embodiment, similar to the exemplary embodiment of FIG. 1, wherein the parts used are largely symmetrical in design.

FIG. 11 depicts a variant differing from FIG. 1, in which slide bushings 15 are designed to be symmetrically identical, as are inner support sleeves 4.1 and 4.2. A thin metal sleeve 4.3 is then additionally incorporated to hold the part together.

The exemplary embodiments of the mount described above are each depicted without a static load in the radial direction. This results in the off-center center relationship of outer support sleeve 5 to inner support sleeve 4. This eccentricity can be reduced or completely abolished once a static load is applied.

We claim:

1. A hydraulically damping rubber sleeve spring comprising:
   two annular elements assembled together axially, each said annular element comprising:
   an inner support sleeve and an outer support sleeve surrounding the inner support sleeve and spaced radially therefrom;
   a spring element constructed of an elastomeric material connecting the support sleeves, said spring element being provided with at least two recesses;

the annular elements being assembled such that the recesses of one of said annular elements interconnect with the recesses of another of said annular elements to form first and second fluid-filled working chambers, said working chambers being sealed, said working chambers being connected to one another by at least one damping passage, whereby the two spring elements are braced against one another such that the axial and radial spring stiffnesses of the rubber sleeve spring can be adjusted separately from one another, and wherein one of the inner support sleeves surrounds one end of the other inner support sleeve, and wherein one of the outer support sleeves surrounds one end of the other outer support sleeve.

2. The hydraulically damping rubber sleeve spring of claim 1, wherein:

one of the inner support sleeves has a substantially trough-shaped profile, and wherein the inner support sleeves are at least partly surrounded at their axial ends by a first spillover formed as a single unit with the spring element, and wherein one of the outer support sleeves is at least partly provided on its outer periphery with a second spillover.

3. The hydraulically damping rubber sleeve spring of claim 2, wherein:

the first and second spillovers are each provided with a contour designed to compensate for lengthwise and diametrical tolerances.

4. The hydraulically damping rubber sleeve spring of claim 2, wherein:

an end of the first spillover comprises knobs.

5. The hydraulically damping rubber sleeve spring of claim 2, wherein:

the circumference of the second spillover comprises undulations.

6. The hydraulically damping rubber sleeve spring of claim 1, wherein:

at least one of the working chambers exhibits a roof-shaped profile on the side of said at least one working chamber facing away from the inner support sleeve, and wherein the spring elements are manufactured with a greater axial length than in an assembled, preloaded state.

7. The hydraulically damping rubber sleeve spring of claim 6, wherein:

the inner and outer support sleeves are made of a metallic material.

8. The hydraulically damping rubber sleeve spring of claim 1, wherein:

the spring elements are manufactured to delimit a substantially O-shaped gap, such that when assembled under axial preload, a portion of said spring elements bulges.

9. The hydraulically damping rubber sleeve spring of claim 1, wherein:

the damping passage is located adjacent a radially inner periphery of at least one of the outer support sleeves.

10. The hydraulically damping rubber sleeve spring of claim 1, further comprising:

a valve made of an elastomeric material, said valve being provided with a closure member projecting toward the inner support sleeves, said valve being arranged axially between the annular parts, and wherein the closure member divides each working chamber into two axially adjacent subchambers and can be actuated by differential pressure inside the subchambers.

11. The hydraulically damping rubber sleeve spring of claim 1, wherein:

one of said inner support sleeves and one of said outer support sleeves is flanged.

12. The hydraulically damping rubber sleeve spring of claim 1, wherein:

the inner sleeves are supported, on a radially inner side of said inner sleeves and at axial ends of said inner sleeves, by at least one slide bushing made of a polymeric material, and wherein the slide bushing is guided axially and radially in a bearing bracket.

13. The hydraulically damping rubber sleeve spring of claim 1, wherein:

the damping passage is serpentine.

14. The hydraulically damping rubber sleeve spring of claim 1, further comprising:

a thin sleeve holding said two annular elements together.

* * * * *